Aug. 4, 1959         A. L. DRAPER ET AL         2,897,894
         RECOVERY OF OIL FROM SUBTERRANEAN RESERVOIRS
                      Filed June 29, 1956
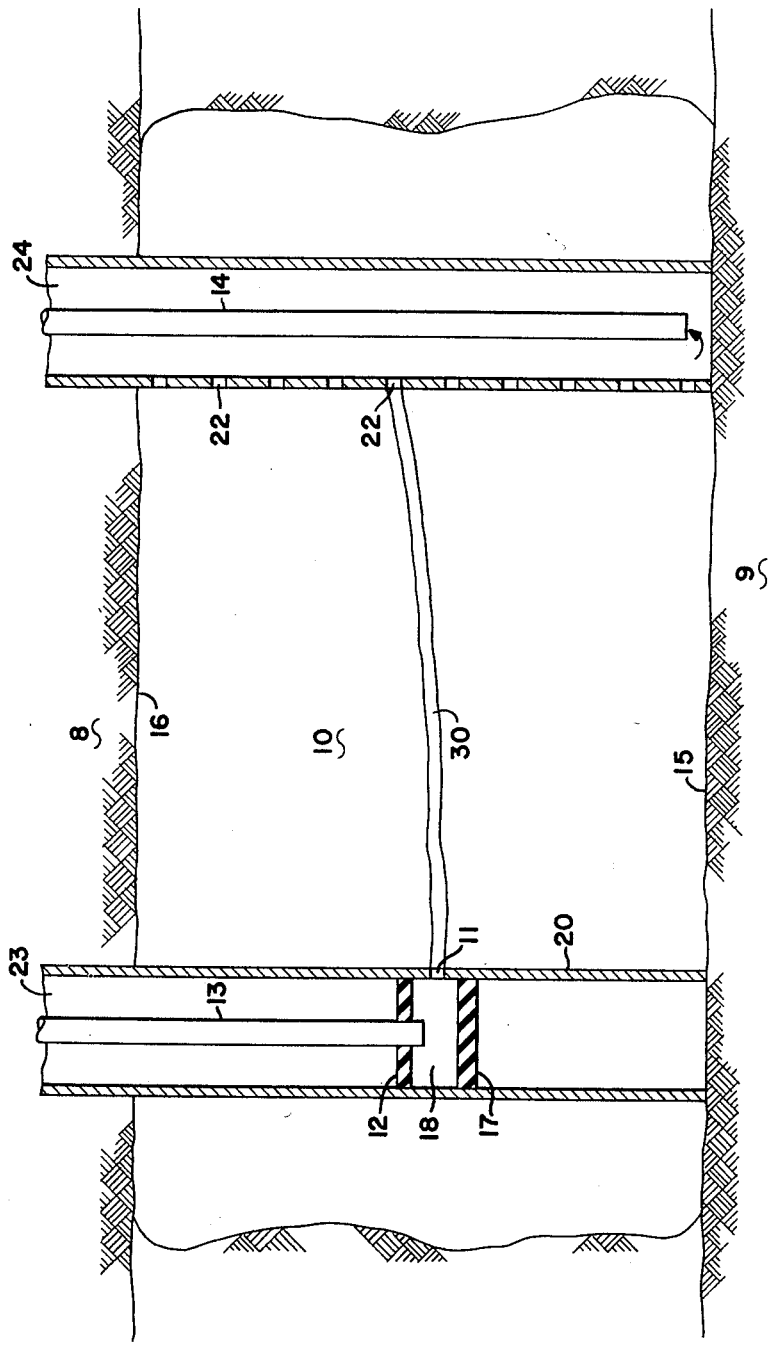
Arthur L. Draper
Edward F. Johnson         Inventors
By W.O. Heilman    Attorney United States Patent Office 2,897,894
Patented Aug. 4, 1959

2,897,894
RECOVERY OF OIL FROM SUBTERRANEAN RESERVOIRS

Arthur L. Draper and Edward F. Johnson, Tulsa, Okla., assignors, by mesne assignments, to Jersey Production Research Company Application June 29, 1956, Serial No. 594,925

7 Claims. (Cl. 166—9)

The present invention generally concerns a method of recovering oil from a subterranean oil reservoir. More specifically, the invention relates to a secondary recovery type procedure for producing oil, and it is especially adapted for use in reservoirs that contain relatively viscous oils—e. g. 10 cps. or more. The invention utilizes a process in which a solvent for oil is injected within an oil reservoir at a rate so as to generate a horizontally disposed zone of increased transmissibility within the reservoir. A fluid conventionally employed as a drive medium in a secondary recovery type process is thereafter injected within the zone of increased transmissibility so as to scavenge oil from the remaining portion of the reservoir.

It has long been recognized by the petroleum industry that a relatively small proportion of the oil in a subterranean oil reservoir is removable from the reservoir during its primary stage of production. More specifically, it has been observed that almost all reservoirs retain from about 30 to 90 percent of their original oil when they have ceased primary production; and it is not unusual for a reservoir to contain at least 50 percent of the oil originally in place following the primary production period.

Accordingly, it has been a continuing problem and objective in the petroleum industry to recover the relatively large proportion of oil that remains within a reservoir that has lost, or that has never possessed, a natural gas or water drive. A number of methods have been suggested or employed to date for this purpose; and in general all of these methods call for driving a fluid laterally through a reservoir so as to scavenge or displace oil from the reservoir. Conveniently, the scavenging fluid is injected within a reservoir through one or more injection wells; and the oil displaced by the fluid is withdrawn from the reservoir through one or more production wells at spaced points from the injection wells. Fluids that have been employed or suggested thus far as scavenging media in secondary recovery procedures include gases such as natural gas, carbon dioxide, methane, flue gas, wet hydrocarbon gases, etc., and liquids such as water, petroleum fractions, aqueous sugar solutions, etc. Unfortunately, none of these procedures is effective in recovering more than about 50 percent at most of the oil remaining within a reservoir.

Fluids that have appeared to be very attractive for secondary recovery operations are fluids such as steam and hot combustion gases which heat up a reservoir, thereby reducing the viscosity of the oil within the reservoir and rendering it much more mobile. The use of hot gases is especially attractive in reservoirs containing relatively viscous oils of the order of 10 centipoises or more, since their viscosity-reducing effect is especially beneficial in such instances. Steam appears to be very effective and attractive for this type of operation; although hot gases—generated by combustion processes conducted either outside or directly within a reservoir—have also been mentioned and used.

While methods of heating a reservoir for scavenging oil from the reservoir have been recognized to possess very desirable advantages, they have also been recognized to have serious disadvantages. For example, in the case of combustion processes, it is difficult to regulate and maintain a combustion front throughout a reservoir. Frequently, the combustion process is interrupted and the flame front disappears, generally necessitating abandonment of the operation.

In the case of steam injection processes, it has been found that these processes are very slow and that it takes very long periods of time for the steam to effectively penetrate and heat up a reservoir. Furthermore, when the pressure of the steam is increased in an effort to speed up the recovery process, the accompanying rise in the temperature of the steam causes large amounts of heat to be lost to surrounding formations. Indeed, even at low operating pressures, heat losses in a steam injection process are undesirably high—thereby making this type of operation inefficient and uneconomical.

Another process which has been recently developed, and which appears to be somewhat attractive, is a process in which a bank of oil solvent is propelled through a reservoir by means of a following driving fluid. Thus, a fluid material which is miscible with oil is first injected into a reservoir through one or more injection wells; and a second fluid is thereafter injected into the reservoir so as to drive the first fluid through the reservoir toward one or more spaced production points. The oil-miscible fluid mixes with the reservoir oil, reduces its viscosity thereby increasing its mobility, and scavenges the oil from the reservoir by moving it toward the production wells. A particularly attractive material for use as the solvent fluid in this type of process has been found to be liquefied petroleum gas (hereinafter referred to as L.P.G.) generally containing such gases as ethane, propane, butane or pentane. A particularly suitable driving fluid for use with L.P.G. has been found to be natural gas, since this material is at least partially miscible with the L.P.G. under most reservoir conditions of pressure and temperature. In general, it is preferred that the solvent be at least partially miscible with the oil as well as with the driving fluid.

While the fluid-propelled solvent bank processes have been recognized to be very effective and efficient in removing large amounts of oil from the portions of a reservoir that are contacted by a solvent bank, it has also been recognized that these processes are characterized by several disadvantages. Thus, in cases where water is employed as a fluid for driving a solvent such as L.P.G. through a reservoir, it has been found that the reservoir oil may be effectively displaced by the solvent but that the solvent itself is not effectively displaced by the water. In other words, the oil may be recovered from a reservoir only at the cost of sacrificing the solvent. Again, it has been observed that very slow solvent flow rates through a reservoir should be maintained in order to thoroughly contact and scavenge a reservoir of its oil. Furthermore, it has been found that it is necessary to operate and control such an operation so as to obtain and maintain a discrete solvent bank throughout a reservoir, if effective removal of large amounts of oil is to be realized from the reservoir. It is contemplated that such a discrete bank extends vertically throughout a reservoir and that it could range from as much as 1,000 to 5,000 feet in length depending upon the thickness of the reservoir, the distance between the injection and producing wells, and the velocity of solvent injection.

The necessity of maintaining a discrete bank of solvent in solvent bank-propelled processes of secondary recovery makes it necessary to exercise considerable care in operating these processes. For example, it is generally necessary to employ relatively large amounts of solvent to effect high oil recoveries; and it is also necessary to employ relatively slow solvent velocities through a reservoir in order to maintain discrete banks of solvent. Thus, it is generally necessary to employ apparent rates of solvent advance through a reservoir that fall within the range from about 0.1 to 1.0 feet per day, depending upon such factors as the viscosity of the oil in place, the viscosity of the solvent and the thickness of the reservoir.

Accordingly, it is an object of the present invention to provide a method of secondary recovery which embodies the advantages of the known and presently available methods of secondary recovery without being beset by the disadvantages that characterize these methods. More specifically, it is an object of the invention to provide a method of oil recovery from reservoirs that lack natural drive means which is characterized by high efficiency as well as good economy. It is especially an objective of the invention to provide a method of oil recovery which is rapid, efficient and economical.

These and related objectives that will become more apparent with the ensuing description are attained by the present invention through the use of what is in essence a two-step process. In a first step of the process a liqueform oil solvent, which has a viscosity less than the viscosity of the oil within a reservoir, is injected into the reservoir in a manner such that the solvent channels through the reservoir in one or more thin laminar flow paths. In other words, the first step of the process results in the formation of at least one thin solvent-containing laminar stratum which extends from one or more injection points to one or more producing points. Preferably, the operation in any given reservoir is carried out substantially concurrently throughout the reservoir so that one or more such laminae extend substantially throughout the reservoir.

Following the solvent injection step, a scavenging fluid is thereafter injected into the solvent-containing laminae so that reservoir oil is displaced from the remaining portions of the reservoir. Any of the scavenging fluids that are conventionally used in secondary recovery operations—e.g. the fluids mentioned earlier in this description—may be used to advantage in this step of the present process. It has been found, however, that especially effective and desirable results may be obtained by injecting a reservoir heating fluid such as hot gases of combustion in this step of the process. A preferred scavenging fluid for use in this phase of the process is steam, since unusually high recoveries of oil are possible with this fluid under efficient and economical operating conditions.

At this point it is well to note that the transmissibility of any given reservoir or formation is by definition directly proportional to its permeability and inversely proportional to the viscosity of the fluid contained within the reservoir or formation. It follows, then, that the first step in the process of the present invention—i.e. the solvent injection step—results in the formation of one or more thin laminar zones of increased transmissibility within a reservoir or formation.

The solvent to be employed in the first step of the process of this invention should, as pointed out above, be liqueform under the conditions prevailing within a reservoir treated by the process. The solvent furthermore should be less viscous than the reservoir oil, preferably having a viscosity less than one-tenth that of the oil. It is additionally preferred that the solvent be not only at least partially miscible with the oil but also with the scavenging fluid which is injected in the second phase of the process.

Solvents that are suitable for use in the practice of the invention are materials that generally meet the requirements stated above. Thus, suitable materials include mixtures of refined hydrocarbons such as light naphthas, heavy naphthas, kerosenes, diesel fuels and the like. They also include straight-run petroleum fractions such as light virgin naphthas, heavy virgin naphthas and especially LPG. Ketones such as acetone and methylethyl ketone; aromatic hydrocarbons such as benzene; paraffinic hydrocarbons such as propane, butane, pentane, etc.; polymeric hydrocarbons such as di-isobutylene; and the like may also be used.

The amount of solvent that must be employed in the first step of the process may vary somewhat depending upon the viscosity of the reservoir oil, the thickness of the oil-containing formation; well spacing; viscosity of the solvent, and the injection pressure. It is contemplated, however, that the volume of solvent should never exceed more than about 3 percent by volume of the pore volume of the reservoir to be treated. Indeed, it is contemplated that the total volume of solvent employed in the initial step of the process generally should not exceed about 2 percent by volume of the pore volume and will almost never exceed 1 percent by volume. It is readily apparent, then, that the amount of solvent employed in this process is far less than the amounts that are generally used in presently conventional solvent methods of secondary recovery.

The pressure exerted upon the solvent—i.e. the solvent injection pressure—should generally be the maximum consistent with the available equipment, since the advance of the solvent through the reservoir treated will generally be directly related to the injection pressure. It will be recognized, however, that the injection pressure should not exceed the pressure required to lift the overburden at any point within the cross section of the earth under treatment. The pressure required to lift the overburden is usually equal to at least about one p.s.i. per foot of well depth and is generally referred to as the fracturing pressure. In the present process, therefore, it will be desirable to operate at maximum pressures slightly below this; and the usual upper pressure used in most operations will generally be equal to about .8 pound per square inch per foot of well depth.

Once the solvent injection step has been completed and one or more laminar zones of increased transmissibility within a reservoir have been formed, the driving or scavenging fluid may be injected into the solvent-filled zones. In some instances it may be desirable to recover the solvent from solvent-filled zones before proceeding with the second phase of the process. In such cases the solvent may be readily recovered by flushing a gas such as natural gas, nitrogen, air, or the like through the solvent-filled strata. Due to the relatively small amounts of solvent involved, however, it will be generally desirable to proceed immediately with the injection of the scavenging fluid itself. As pointed out earlier, the preferred fluid for the purpose of the invention is steam. As will be apparent, the steam should be under pressure and therefore at a temperature consistent with reservoir conditions. In general, the pressure should be less than the fracturing pressure and should preferably be at the maximum consistent with reservoir conditions and the available equipment.

In instances where it is desirable to prevent heat losses as much as possible, non-condensing gases may be admixed with the steam prior to the injection of the steam. The diluent gas makes it possible to use relatively low temperature steam under relatively high pressure. The result, of course, is that high pressure injection with attendant high rates of solvent advance through the reservoir are possible with minimum heat loss. Suitable diluent gases include flue gas, nitrogen, air, the various inert gases, methane, etc.

Where the vertical position of the point of solvent injection within a reservoir is not critical, no special effort need be made to preselect or control the point of injection. It has been observed that the solvent will advance from the injection well through the reservoir in one or more laminar flow paths, even though the reservoir may be substantially uniform in its physical characteristics. For some as yet unascertained reason, the solvent preferentially selects certain narrow zones or "fingers" to travel through, and these zones extend eventually directly from the injection well or wells to the producing well or wells. It may be that the following equation contains some explanation of the occurrence of the zones or "fingers":

$$c = 1 - \epsilon^{-PV}$$

This equation is a generalized theoretical one relating to high velocity miscible fluid injection processes such as are encountered in scavenging a porous medium of one liquid by the injection of a second liquid—i.e. a solvent. The terms in the above equation have the following meanings:

$c$ = concentration of the solvent at the outlet from the porous medium
$PV$ = pore volumes of solvent throughput The concentration of the solvent at the outlet is finite according to the equation as soon as injection begins. Observations indicate that 0.01 to 0.02 pore volume of solvent, however, are required for a measurable concentration to occur at the outlet. It should also be noted that the equation does not take into account viscosity differences between the solvent and the original liquid in place. If the solvent viscosity is appreciably less than that of the original fluid, it would appear that higher solvent concentrations would occur at the outlet sooner than the equation would predict.

It will be appreciated that in some instances it will be desirable to predetermine and preselect the point of vertical placement of the position of maximum solvent penetration within a reservoir or formation. For example, where the scavenging fluid to be employed in the second step of the process is steam, it will frequently be desirable to form the laminar flow paths substantially along the mid point, in a vertical sense, of the reservoir or formation treated. One or more packers may be positioned within each injection well in such cases; and the solvent directed down the injection well, between the packers, and thence into the reservoir. Alternatively, perforating bullets or shaped charges may be used to provide passageways for the solvent that extend deep within a reservoir and hence preferentially direct the solvent along flow paths initiated by the passageways.

When it is desired to direct the solvent along a flow path that is immediately below the upper vertical boundary or surface of an oil-containing formation, a packer may be installed within the injection well immediately below the upper boundary of the formation; and the solvent may be injected between the packer and the upper boundary. Use of a solvent which has a density substantially less than the density of the reservoir oil will also help in such cases to keep the flow path of the solvent within a stratum immediately below the upper boundary. It will be apparent that preferential flow of the solvent along the lower boundary of a formation may similarly be realized by the placement of a packer within the injection well slightly above the lower boundary—in conjunction with the use of a solvent having a substantially greater density than the density of the reservoir oil.

Insofar as the types of injection or flooding patterns are concerned, it should be noted that any of the conventional linear flooding programs, or 4-spot, 5-spot, 7-spot, 9-spot, and related flooding patterns may be employed. Just as certain wells in these patterns are employed as injection wells in conventional secondary recovery operations, it is to be understood that such wells are to be similarly employed in carrying out the present process.

The nature of the present invention may be better understood by reference to the attached drawing in which the best mode contemplated for carrying out one embodiment of the invention is set forth. In this embodiment it will be assumed that L.P.G. is to be employed as the solvent in the initial or solvent injection step of the process, and that steam is to be employed as the scavenging fluid in the subsequent or driving step of the process.

Referring to the drawing, there is illustrated an oil-bearing formation 10 which is positioned vertically intermediate formation 8 and formation 9. The surface of the earth is not illustrated, nor is the surface equipment which would normally be employed in conjunction with well operations. Such equipment is well known to those skilled in the art, and inclusion of this material is not considered to be essential for the purposes of this description.

Two wells 23 and 24 are illustrated as penetrating formation 10 and terminating adjacent its lower boundary 15. No sealing means is indicated in the drawing for sealing the lower terminations of the wells, but it may be assumed that suitable cement plugs or other means may be employed for this purpose, if necessary. It will likewise be assumed that the two wells have cased and that the casing has been cemented in position. It will also be assumed that wells 23 and 24 are to serve as the injection well and the producing well, respectively.

With these assumptions, it is desired to implement the present invention by forming a thin laminar zone of increased transmissibility which extends from well 23 to well 24. Since steam is to be employed as the scavenging medium, it is preferred to initiate the zone of increased transmissibility substantially along the vertical center of the formation. Accordingly, a bridge plug 17 is inserted within well 23 and positioned just below the vertical mid point of formation 10. Casing 20 is then perforated at point 11 to provide a fluid passageway between well 23 and formation 10. A packer 12 and a string of well tubing 13 are thereafter positioned as illustrated so as to establish a continuous fluid passageway from the surface of the earth and thence through perforation 11 into formation 10.

The production well 24 may be an open hole; or it may be a cased and cemented well as shown in the drawing. In the latter case it is desirable that the casing be perforated at a number of spaced vertical points 22 for reasons that will be more apparent in the following description. A string of well tubing 14 is inserted into well 24 and connected with suitable surface equipment for adapting this well for producing operations.

At this point solvent in the form of liquefied petroleum gas is forced through tubing 13 to the enclosed space 18 between packer 12 and bridge plug 17 and thence through perforation 11 into formation 10. The solvent is injected under a pressure sufficient to maintain the solvent in a substantially liquid form; and the rate of injection is maintained such that a stabilized bank of the solvent cannot be formed before the solvent has traveled laterally through reservoir 10 to well 24. Apparent rates of solvent advance of greater than 2 feet per day and preferably at least 10 feet per day should be used to insure the realization of the desired type of flow. At this point it should be noted that the apparent rate of solvent advance is assumed for the present purposes to be that rate which corresponds to the solvent perfectly displacing the oil in place. This rate is equivalent to the average linear velocity in a single component system—i.e. the so called superficial linear velocity of the fluid in motion. With two components present in one phase, the actual velocity of the lower viscosity solvent has been observed to exceed the apparent rate by factors ranging from 4 to 20 depending on the oil-in-place viscosity relative to the solvent viscosity.

Under the conditions set forth above, the solvent will inherently flow through a thin laminar zone 30 terminating at well 24 through one of the perforations 22, as illustrated. It will be recognized that some oil may be displaced by the solvent in traveling along this flow path, and this oil—or at least a portion thereof—may be recovered within well 24. The oil recovered may be continuously withdrawn to the surface of the earth through production tubing 14, and the oil thus produced may be continuously or periodically analyzed for detection of solvent breakthrough. As mentioned earlier, the amount of solvent within zone 30 at the time of breakthrough into well 24 will constitute less than 3 volume percent of the pore volume of the reservoir 10 lying effectively between wells 23 and 24.

Upon breakthrough of the solvent into well 24, the second phase of the present invention may be initiated. In this latter phase, steam may be forced down through tubing 13 and thence through perforation 11 into formation 10 in the same manner as the solvent which preceded it. Due to the increased transmissibility of zone 30 as compared to the remaining portion of the reservoir, the steam preferentially flows through zone 30 and thereby penetrates deeply within the formation. As it travels through the formation in this manner, the steam transfers heat to the reservoir oil and reduces the viscosity of the oil very substantially. The heating process is continued and expanded until the entire reservoir may be brought up to any desired temperature—the temperature of the steam itself providing an upper temperature limit.

As the reservoir oil is heated by the steam, its viscosity decreases and its mobility within the formation thereby greatly increases. Due to its increased mobility the oil flows or drains from the reservoir into the production well 24, whence it is removed to the surface of the earth through tubing 14. The process is continued until ultimate oil recovery is attained.

At this point it will be recognized that numerous modifications may be incorporated within the process just described without departing from the spirit or scope of the invention. For example, it will be apparent that more than one solvent created laminar flow path may be formed within a reservoir in order to improve oil recovery. It will further be recognized that the scavenging fluid may be injected into a reservoir through each end of each solvent-created laminar flow path if so desired. Likewise, fluids other than steam may be used as the scavenging fluid depending, for example, upon the availability of the fluids and the economic conditions surrounding the operation.

It will be appreciated that the channels or laminar flow paths which are formed in the initial step of the process of this invention are attractive passageways for the entrance of a fracturing fluid within a reservoir. Substantially any of the presently conventional fracturing fluids—with or without fracturing sand—may be injected within one or more of the laminar flow paths under a pressure sufficient to lift the overburden.

In reservoirs that are characterized by substantial vertical permeabilities, the present invention makes it possible to employ vertical flooding or secondary recovery programs in a particularly beneficial manner. Thus, in such a reservoir possessing vertical permeability, solvent may be injected along the upper and/or lower boundaries of the reservoir to form the usual solvent-filled thin laminar flow paths or zones of high transmissibility. The scavenging fluid may then be injected into one or both of the high transmissibility zones and thereafter driven vertically through the reservoir, displacing solvent and the reservoir oil before it. The displaced oil, of course, may be withdrawn from the reservoir through one or more production wells. As in other conventional secondary recovery operations, conventional scavenging fluids such as steam, water, gas, and fluid-propelled solvent banks may be used in carrying out vertical flooding operations. Gas propelled solvent banks —e.g. natural gas-propelled L.P.G.—are especially attractive and effective for the stated purpose.

It will also be recognized that several scavenging fluids may be used sequentially in the present invention. Thus in the process illustrated in the drawing, a scavenging fluid other than steam may be injected in a reservoir after the reservoir has been first heated by the injection of steam.

What is claimed is:
1. A process for recovering oil from a subterranean oil-bearing reservoir penetrated by two laterally spaced wells, which comprises: injecting a liqueform oil solvent having a viscosity less than and a density different from the reservoir oil through a first of said wells into the reservoir, the point of solvent injection being in the upper part of the reservoir when the solvent is less dense than the oil and in a lower part of the reservoir when the solvent is more dense than the oil, injecting the solvent in a quantity sufficient to advance it toward the second of said wells at an apparent rate through the reservoir of greater than two feet per day, following the injection of the solvent with the injection of an oil-displacing fluid, and withdrawing oil from the reservoir through at least one of said wells at a point vertically spaced from the injection point, the point of withdrawal being below said injection point when the solvent is less dense than the oil and above said injection point when the solvent is more dense than the oil.

2. A process as defined in claim 1 in which the solvent is intermediate in density between the oil and the oil-displacing fluid.

3. A process for recovering oil from a subterranean oil-bearing reservoir having vertical permeability and penetrated with two laterally spaced wells, which comprises: injecting an oil solvent having a viscosity less than and a density different from the reservoir oil through a first of said wells into the reservoir, the point of solvent injection being in the upper part of the reservoir when the solvent is less dense than the oil and in a lower part of the reservoir when the solvent is more dense than the oil, injecting the solvent at a rate sufficient to advance it toward the second well at an apparent rate greater than two feet per day until solvent is produced at a point in the second well, thereafter injecting an oil-displacing fluid into the reservoir via the injection point within said first well and via the production point within said second well, and recovering oil thus displaced from the reservoir through said wells at points vertically spaced from said injection and said production points, the points of recovery being below the injection and production points when the solvent is less dense than the oil and above the injection and production points when the solvent is more dense than the oil.

4. A process for recovering oil from a subterranean oil-bearing reservoir penetrated by two laterally spaced wells which comprises: injecting a liqueform oil solvent having a viscosity less than the reservoir oil through a first of said wells into the reservoir, the rate of injection of said solvent being sufficient to advance the solvent at an apparent rate greater than two feet per day through the reservoir until the solvent enters the second well thereby forming a zone of increased transmissibility within the reservoir which extends between the two wells, thereafter injecting an oil-displacing fluid into said zone from at least one of said wells, and recovering oil thus displaced from the reservoir through at least one of said wells.

5. A process as defined in claim 4 in which the rate of advance is greater than ten feet per day.

6. A process as defined in claim 4 in which the solvent has a viscosity less than one-tenth that of the reservoir oil.

7. A process as defined in claim 4 in which the oil-displacing fluid is steam.

References Cited in the file of this patent
UNITED STATES PATENTS

| | | |
|---|---|---|
| 1,491,138 | Hixon | Apr. 22, 1924 |
| 2,742,089 | Morse et al. | Apr. 17, 1956 |
| 2,754,911 | Spearow | July 17, 1956 |

FOREIGN PATENTS

| | | |
|---|---|---|
| 696,524 | Great Britain | Sept. 2, 1953 |